US 6,574,590 B1

(12) United States Patent
Kershaw et al.

(10) Patent No.: US 6,574,590 B1
(45) Date of Patent: Jun. 3, 2003

(54) MICROPROCESSOR DEVELOPMENT SYSTEMS

(75) Inventors: Simon Martin Kershaw, San Jose, CA (US); Graham Kirsch, Tadley (GB); Brendon Slade, San Jose, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/423,596

(22) PCT Filed: Mar. 18, 1999

(86) PCT No.: PCT/GB99/00840

§ 371 (c)(1),
(2), (4) Date: Jan. 24, 2000

(87) PCT Pub. No.: WO99/48001

PCT Pub. Date: Sep. 23, 1999

(30) Foreign Application Priority Data

Mar. 18, 1998 (GB) ............................................... 9805832
May 19, 1998 (GB) ............................................... 9810774

(51) Int. Cl.$^7$ ............................................... G06F 9/455
(52) U.S. Cl. ........................... 703/28; 703/23; 714/726; 712/227
(58) Field of Search ............................. 703/23, 25, 27, 703/28, 21; 714/30, 726, 727, 227, 35, 39, 724, 733; 712/16, 18, 227; 717/124, 128, 129

(56) References Cited

U.S. PATENT DOCUMENTS

| | | | | |
|---|---|---|---|---|
| 5,479,652 A | * | 12/1995 | Dreyer et al. | 714/30 |
| 5,757,819 A | * | 5/1998 | Segars | 714/727 |
| 5,812,562 A | * | 9/1998 | Baeg | 714/726 |
| 5,915,083 A | * | 6/1999 | Ponte | 714/30 |
| 5,983,017 A | * | 11/1999 | Kemp et al. | 717/129 |
| 6,085,336 A | * | 7/2000 | Swoboda | 714/30 |
| 6,112,298 A | * | 8/2000 | Deao et al. | 712/227 |

* cited by examiner

Primary Examiner—Samuel Broda
Assistant Examiner—K Thangavelu
(74) Attorney, Agent, or Firm—Carstens, Yee & Cahoon, LLP

(57) ABSTRACT

A procedure and processor are disclosed for avoiding lengthy delays in debug procedures during access by a memory mapped peripheral device. The processor includes in-circuit emulation means comprising one or more scan chains or serially connected registers for access by an external host computer system. The procedure comprises:

a) the host computer system carrying out a debug procedure via said scan chains, and selectively interrupting such debug procedure for access to a peripheral memory mapped device;

b) the host computer system writing into an area or memory of the processor a program for reading and/or writing data at a specified memory location; and c) the host computer system causing said processor to run said program, and then to return to said debug procedure.

In another aspect, in order to permit small debugging programs to run, in serial scan in circuit emulation processes, on a processor in a deeply embedded application where no program RAM is provided, the processor includes one or more chains of serially connected registers coupled to interface means for access by an external host to enable a serial scan procedure to be carried out, one such chain including a set of serially coupled registers for storing one or more processor instructions read into a set of registers through the interface means, and the processor including address means, for addressing program memory, coupled to said set of registers for addressing the set of registers, and means for reading the processor instructions in the set of registers to an instruction resister of the processor.

12 Claims, 3 Drawing Sheets

MICROPROCESSOR DEVELOPMENT SYSTEMS

The present invention relates to microprocessor development systems.

FIRST INVENTION

Nowadays microprocessor systems are frequently implemented as deeply embedded application specific systems, having a microprocessor core and with stored software routines and/or designed to run specific software routines. In order to remove errors and debug the system designed, microprocessor development systems are employed, which allow a technique called in-circuit emulation or in-circuit debug to enable the hardware and software designs to be debugged together by giving access to the state of the microprocessor and the progress of execution of the software program running on the microprocessor. Typically, this is realised by a special program, sometimes called a debug monitor, which runs on the microprocessor and is loaded into the microprocessor to interface to a debug or development system running on a host computer and to provide functions for accessing registers and memory of the microprocessor. Resources are provided for the debug monitor or program and host computer to use, such as reserved areas of program memory to hold the monitor program code and data memory for holding data transfer between the host and target system. The monitor program is executed by the microprocessor entering a special state and provides operations such as register and memory interrogation and modification.

The disadvantages with the traditional debug monitor technique is that space must be reserved for the monitor program in the target systems memory map, and space must be reserved for data used during transactions between the host computer system and the target system. The extra memory required to implement the traditional debug monitor approach is significant, and increases system cost.

In another technique for microprocessor development, which in general avoids the cost of implementing monitor programs in the target processor, known as a serial scan technique, a serial scan interface is provided to clock data into and out of the target system one bit at a time. The microprocessor's registers are coupled together in series to form one or more test scan/chains which can be accessed by the external host to load test data and to read out the results in a serial manner. This permits the complete workings of the microprocessor to be observed. Most access to memory and peripherals can be achieved using the scan interface since control over the microprocessor buses is possible by coercing the state of the microprocessor via its registers.

Whilst the serial scan technique does not have the memory overhead of the monitor program technique, it can prove problematic for access to certain types of memory and peripherals:

i) When in debug mode all processor operations occur at the speed of the debug clock which is typically much lower the normal clock. Certain peripherals need to be accessed at full speed and are thus not accessible when in debug mode.

ii) When memories are shared between processors a protocol is defined that controls accesses to this memory from either processor. Support of this protocol in debug mode and at debug speeds can be complex or even impossible to achieve.

This invention applies to a serial scan technique for debugging a target processor. The basis of the invention is to employ a small, temporary, target processor monitor program to perform memory and peripheral accesses under control of the debugging host computer system. This monitor program is downloaded into the target processor via a scan chain, and does not require reservation of part of the target processor memory map.

Accordingly, the present invention provides in a processor including in-circuit emulation means comprising one or more scan chains of serially connected registers coupled to interface means for access by an external host, a method of carrying out a debug procedure, the method comprising:

1. providing a host computer system, the host computer system carrying out a debug procedure with said scan chains, and interrupting such debug procedure for access to a peripheral or memory mapped device,
2. the host computer system copying an area of memory of the processor and writing into said area of memory a program for reading and/or writing data at a specified location, (which location corresponds to a memory mapped area for peripheral access), and
3. the host computer causing said processor to run said program, and then to return to said debug procedure in which data from said specified location may be read to said host computer system.

SECOND INVENTION

Nowadays microprocessor systems are frequently implemented as embedded systems having a microprocessor core and with stored software routines and/or designed to run specific software routines. Some or all of the peripherals of the system are commonly incorporated in a single integrated circuit (IC). In order to remove errors and debug the system design, microprocessor development systems are employed, which generally allow a technique called in-circuit emulation or in-circuit debug to enable the hardware and software designs to be debugged together by giving access to the state of the microprocessor, as part of the hardware design, and the progress of execution of the software program running on it. Typically, this is realised by a special program, sometimes called a debug monitor, which runs on the microprocessor and is loaded into the microprocessor to interface to a debug or development system running on a host computer and provide functions for accessing registers and memory of the microprocessor system. Resources are provided for the debug monitor program and host computer to use, such as reserved areas of program memory to hold the monitor program code and data memory for holding data transfer between the host and target system. The monitor program is executed by the microprocessor entering a special state and provides operations such as register and memory interrogation and modification. Special provision must be made for the monitor program to execute, including program and data memory.

The disadvantages of this method are that it requires program memory resources (either RAM or ROM) to be provided in the system to hold the monitor program. If ROM is provided, this causes a reduction in the available program memory space for the application program. If RAM is provided, more RAM than otherwise will be required. In some systems this may mean that RAM will need to be provided where otherwise it would not.

In a deeply embedded application, such as a microprocessor which is a core element in an integrated circuit, it is an undesirable additional cost to provide memory resources to implement a monitor program. Access for debug software running on a deeply embedded microprocessor can be provided by means of a serial scan interface: that is by clocking data into and out of the system one bit at a time. In this serial scan method, known as ScanICE (trade mark), registers are provided throughout the microprocessor, coupled together in series to form a test scan chain which can be accessed by an external host to load test data into the scan chain and to read out the results. This permits the complete workings of the microprocessor to be observed. The main advantage of this serial scan method is that the test scan chain is used to retrieve the entire state of the microprocessor without the need for a monitor program to provide access to the internal registers. The serial scan method can be used to access memory mapped devices, slow memory, off-chip interfaces and so on. Specially designed hardware interfaces are designed into the system, which are controlled by the scan control logic. The scan control uses its complete access to all of the microprocessor's control signals to control the interface logic using successive scanned vectors. However, this method is very complex, requires a lot of additional logic and may be very difficult to use in mixed memory systems. Sometimes it is not economical or even possible to implement a hardware scan interface to a microprocessor peripheral in a system in this way.

A technique known as a "micromonitor" has been devised as a modification of the serial scan method to simplify memory access. In this a small program is downloaded into the processor's program memory to perform memory accesses using the normal microprocessor mode of operation (rather than using scan registers to control the memory interface). In this method, a quantity of program RAM and of data RAM is read by the debug system, and stored elsewhere, i.e. backed-up. A very small program is loaded, using serial scanning, into this available program RAM space after having read and backed up the previous contents. Using the available data RAM space as a transfer data buffer, the program is used to access the memory or peripheral by returning the microprocessor to its normal running state executing instructions at the addresses of the available quantity of program RAM. Once the data transfer is complete, the backed-up data and program RAM contents are loaded back into the quantity of RAM and execution can continue normally. Hence the need for complex logic is reduced. However, this method relies on there being some accessible program RAM which is writable, because it is still necessary to read portions of the microprocessor's data and program into the debugging system and to store them while the memory is used for the requirements of the micromonitor. Many embedded systems only contain ROM for program memory, so there is no possibility of downloading a micromonitor into normal RAM.

The basis of the present invention is to provide in a microprocessor or other processor, particularly an embedded processor core, a set of registers which can be loaded with program instructions from a test scan chain in the serial scan mode, and thereafter accessed by the processor for executing, in a normal manner, a short sequence of code.

Thus, the advantage of the "micromonitor" approach described above is preserved while permitting use of the "micromonitor" approach where no program RAM is available.

Accordingly, the present invention provides in a first aspect a processor including in-circuit emulation means comprising one or more chains of serially connected registers coupled to interface means for access by an external host to enable a serial scan procedure to be carried out, one such chain including a set of serially coupled registers for storing one or more processor instructions read into set of registers through the interface means, and the processor including address means, for addressing program memory, coupled to said set of registers for addressing the set of registers, and means for reading the processor instructions in the set of registers to an instruction register of the processor.

In a second aspect, the invention provides a method of in-circuit emulation for a processor comprising:

1) providing in the processor one or more chains of serially connected registers coupled to an interface means, one of said one or more chains including a set of serially coupled registers, such register set being coupled to the address and data buses of the processor, 2) feeding to the register set, through said interface means and said one scan chain, one or more processor instructions, 3) directing the processor to address the register set via its address bus, and to fetch on its data bus, the instruction stored therein and to carry out the instruction.

As preferred, the means for reading the processor instructions comprises a multiplexor arranged to receive the information in the set of registers at one input and the information from program memory at another input, the inputs being selected by a debug mode control signal. This permits the addressing of the registers by a range of addresses within the normal program memory address range, and for the information provided by the program memory when such address are asserted to be deselected.

Thus, the invention provides a "register file" within the processor which can be loaded using the scan interface, and provides a special mode of operation substituted for normal program memory access as the source for fetched instruction and hence hold a micromonitor program.

The invention is implemented by embedding a set of registers within the processor. As preferred, the registers are arranged as a register file with a word width the same as the instructions of the processor, and a few words deep. Words of data from the register file can be read one at a time by applying an address, which is derived from the normal program address range of the microprocessor. The register file data output is multiplexed with the normal program instruction read data. The multiplexer is controlled by a debug control logic signal. Thus, from the microprocessor's point of view the file appears to be a small block of program read only memory which is only selected during debug operations. The register file is loaded with a new micromonitor program by scanning data into it using the serial scan interface. The register file can either be attached to the scan chain of the rest of the microprocessor or it can be connected in a special scan chain of its own. The serial scan control logic controls the data loading procedure.

BRIEF DESCRIPTION OF THE DRAWINGS

A preferred embodiment will now be described with reference to the accompanying drawings wherein.

DESCRIPTION OF THE PREFERRED EMBODIMENT OF FIRST INVENTION

Figure 1:
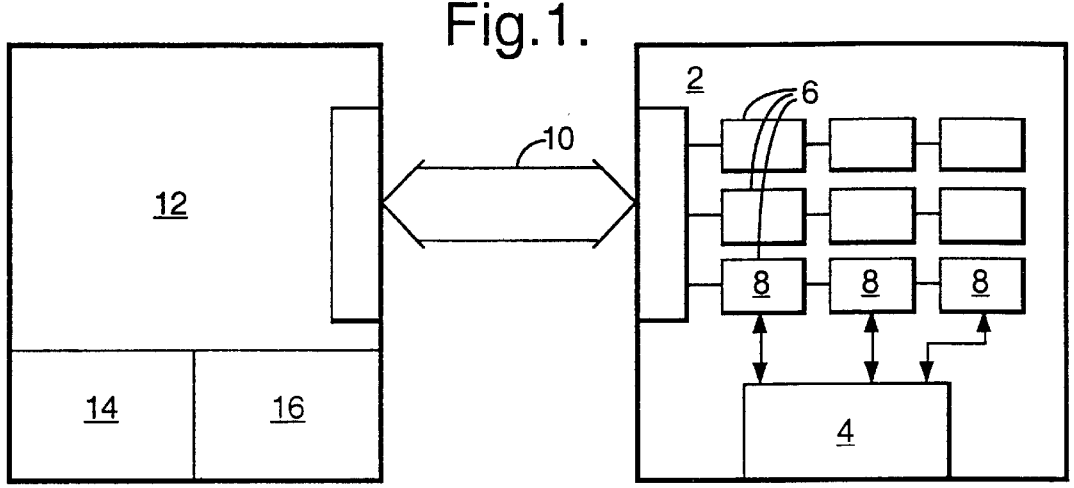
FIG. 1 is a schematic block diagram of a debug system comprising host computer and target processor.

Referring to FIG. 1, there is shown a target processor 2 forming part of a deeply embedded application having an area of memory 4 and a series of scan chains 6 formed by coupling registers of the memory in series in the scan mode. Registers 8 of one scan chain are coupled to memory 4. The scan chains are connected to an interface 10 which is coupled to a host computer 12 and which permits a transfer of data and instructions during a debug or scan procedure. The host computer includes an area of memory 14 which includes a user-configurable file 16. In file 16 are stored data and monitor programs required for access of desired peripherals (not shown) by the target processor.

Figure 2:
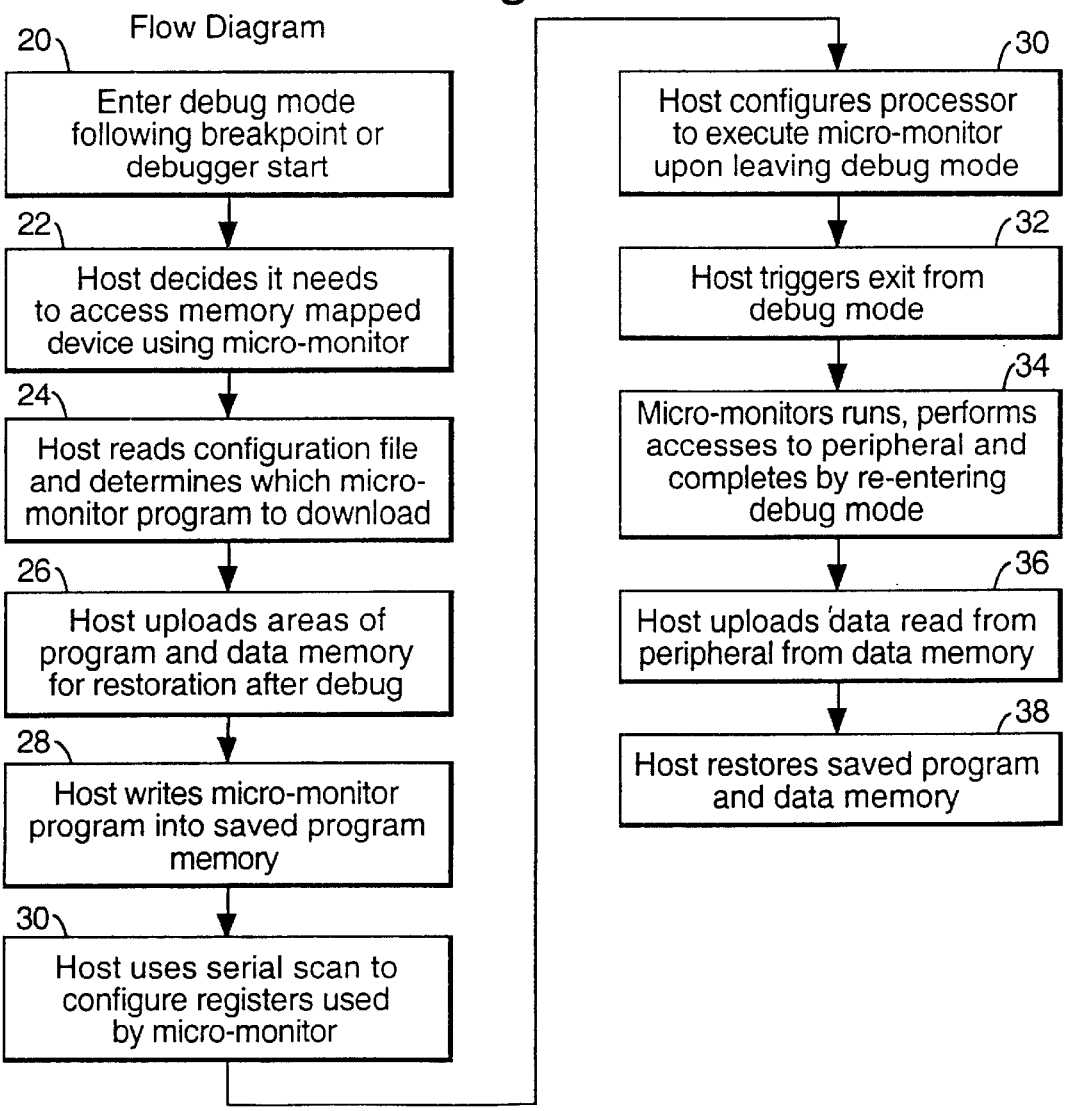
FIG. 2 is a flow chart of a preferred method of carrying out the present invention.

Referring now to FIG. 2, the method in accordance with the preferred embodiment of the invention is carried out as follows:

Upon entry into scanning (debug) mode as at 20, the host system (executing or operating under control of the debugger) scans data out of the target processor's scan chain and saves that information for restoration upon exit from debug mode.

It is assumed the host computer as at 22 needs to access a peripheral or other memory mapped device. The method to be used as at 24 for accessing this area is defined in user-configurable file 16 held on the host computer system 12. The host computer system determines which program to download, but first uploads as at 26 from memory 4 of the target processor, areas of program and data memory for restoration after debug. As at 28, the host writes the monitor program into the uploaded area of memory 4, via the scan chain 6 coupled to memory 4. For devices that must be accessed at normal speed the host must be provided with a program to be run on the target processor to implement the access. This program is referred to as the micro-monitor and may differ between devices. An example program might be:

;;; Set up repeat loop with register R0 defining number of data to read REPEAT R0
  ;;; Read data from peripheral pointed to by register R1 and
  ;;; store data read in data memory pointed to by register R2
  MOVE (R1),(R2)
  ;;; Increment pointer to peripheral
  INC R1
  ;;; Increment pointer to data memory
  INC R2
  END REPEAT
  ;;; Re-enter debug mode
  DEBUG The host computer 12 references registers in the target processor scan chain to permit configuration of the micro-monitor program. These registers are set up via a serial scan prior to executing the program as at 30. In the example above the R0 register defines the number of memory locations to be read, R1 specifies the address of a peripheral and R2 specifies the area of the data memory to which the data read from the peripheral is to be written.

The host then configures processor 2 to execute the program upon leaving debug mode (30), exits debug mode (32), and the program runs (34).

Each time a memory mapped device is to be read or written, the host computer scans the required parameters (address of memory mapped device and number of data to read/write) into specified target processor registers. The host computer then coerces the processor to run the program it has inserted for reading or writing to/from the memory mapped device. This is achieved by leaving scan mode with the processor configured to access the downloaded micro-monitor program at the full processor speed. The final instruction in the micro-monitor program triggers a switch back to debug mode as at 34. The host then, as at 36, uploads into the host, the data from the peripheral in memory 4 and then as 38, restores the program and data into memory 4.

At the end of a debug session the host computer restores the values read from program/data memory. Thus the system is fully restored to its pre-debug state.

The new invention offers the following advantages:
 (a) No additional hardware is required to access devices during scan debug.
 (b) No memory has to be reserved for a monitor program, provided writable program memory is available in the system.
 (c) The host computer debug software does not have to be altered to cope with new peripheral types.
 (d) Access to any memory mapped peripheral or device is possible without affecting the behaviour of that device between normal and debug operating modes.
 (e) Correct access to time-critical peripherals can be made.

DESCRIPTION OF THE PREFERRED EMBODIMENT OF SECOND INVENTION

Figure 3:
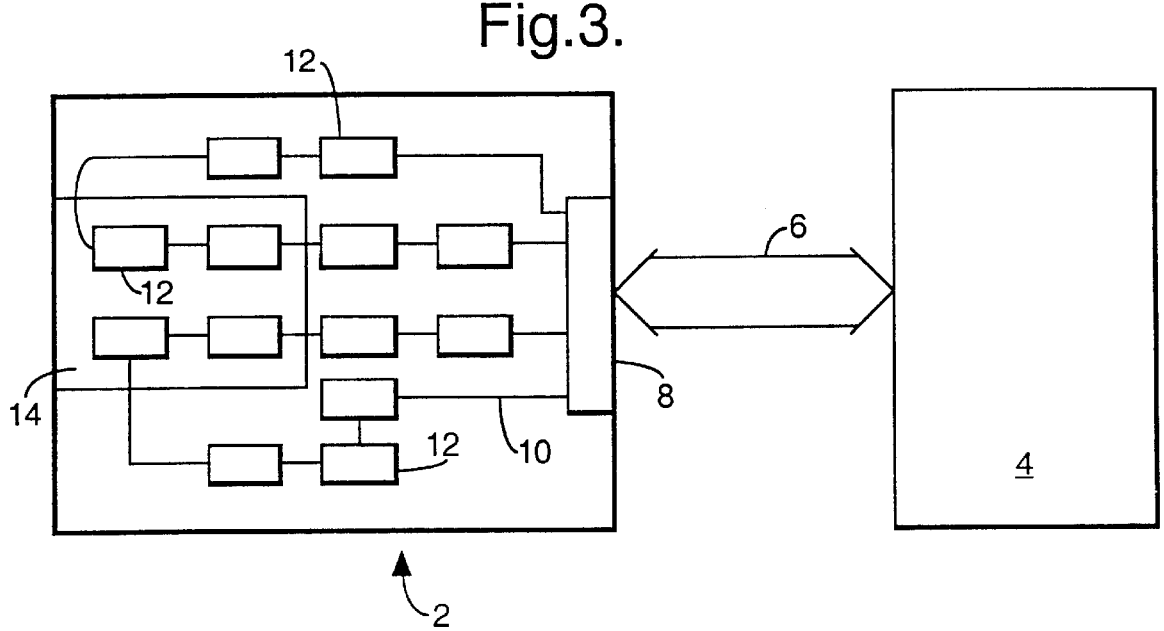
FIG. 3 is a schematic block diagram of an integrated circuit (IC) employing a microprocessor core and including a serial scan system.
Figure 4:
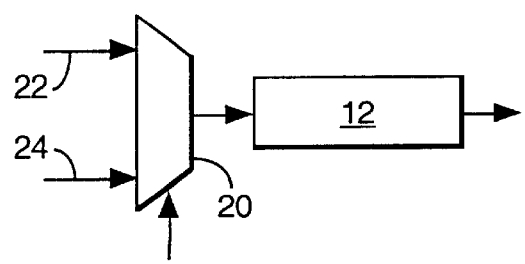
FIG. 4 is a schematic diagram of register with a scan chain of registers.

Referring to FIG. 3 of the drawings, there is shown an IC 2 coupled to a host computer 4 for executing a serial scan debugging or monitor operation known as ScanICE (trade mark). To this end, host computer 4 is coupled via a bus 6 to an interface 8 within the IC. Interface 8 is coupled to a plurality of chains 10 of individual registers 12 disposed throughout the IC and a microprocessor core 14 of the IC. These registers are so disposed that they enable the complete operation of the IC to be observed by the host computer. Normally, test data is loaded in through interface 8 into the scan registers, the processor core carries out one or more operations, and the results thereof, held in the registers 12, are read out back to the host computer. Commonly, the registers 12 are registers which are in any case present in the IC, and as shown in FIG. 4 have a multiplexer 20 coupled to the register input under control of an ICE signal to permit selection of a first multiplexer input 22 representing the scan chain. In normal operation of the processor second multiplexer input 24 is selected.

Figure 5:
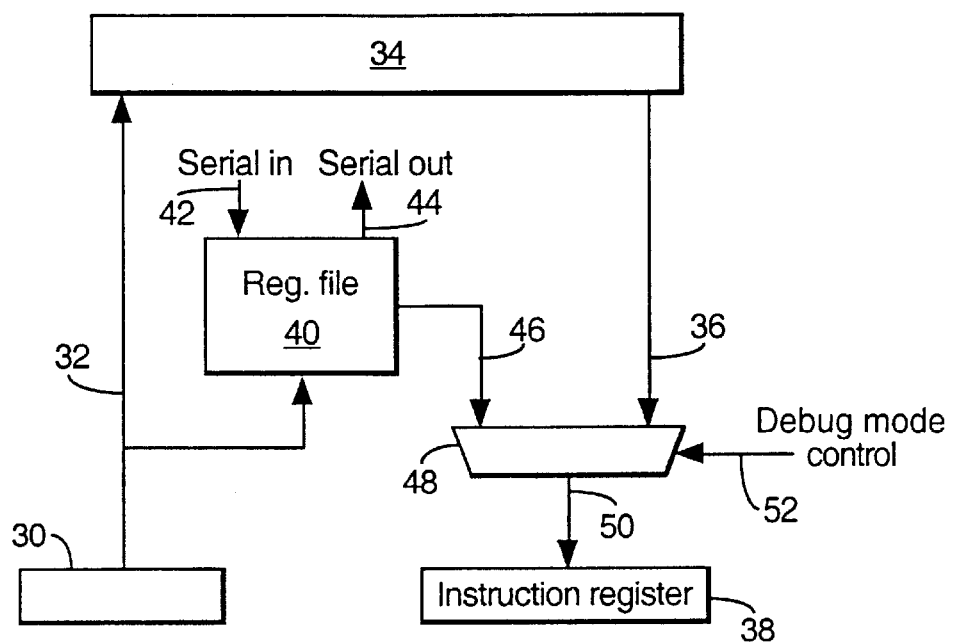
FIG. 5 is a schematic block diagram of part of the microprocessor core of FIG. 1 showing the set of registers in accordance with the invention configured as a register file.

Part of the processor core is shown in FIG. 5. The control unit 30 is coupled via an address bus 32 to program memory 34. Data from the program memory is provided on data bus 36 to an instruction register 38. In accordance with the invention, a register file, or set of registers 40 is coupled to the address bus 32. The register file 40 contains processor instructions read in on a serial line 42 of a scan chain, and read out from the file on a serial out line 44 of the scan chain. Information held in file 40 is also read out on line 46 to a multiplexer 48 as a first selectable input. Multiplexer 48 is also coupled to instruction or data bus 36 as a second selectable input, and the output 50 is provided to instruction register 38. The state of the multiplexer is controlled by a debug mode control signal on line 52.

Figure 6:
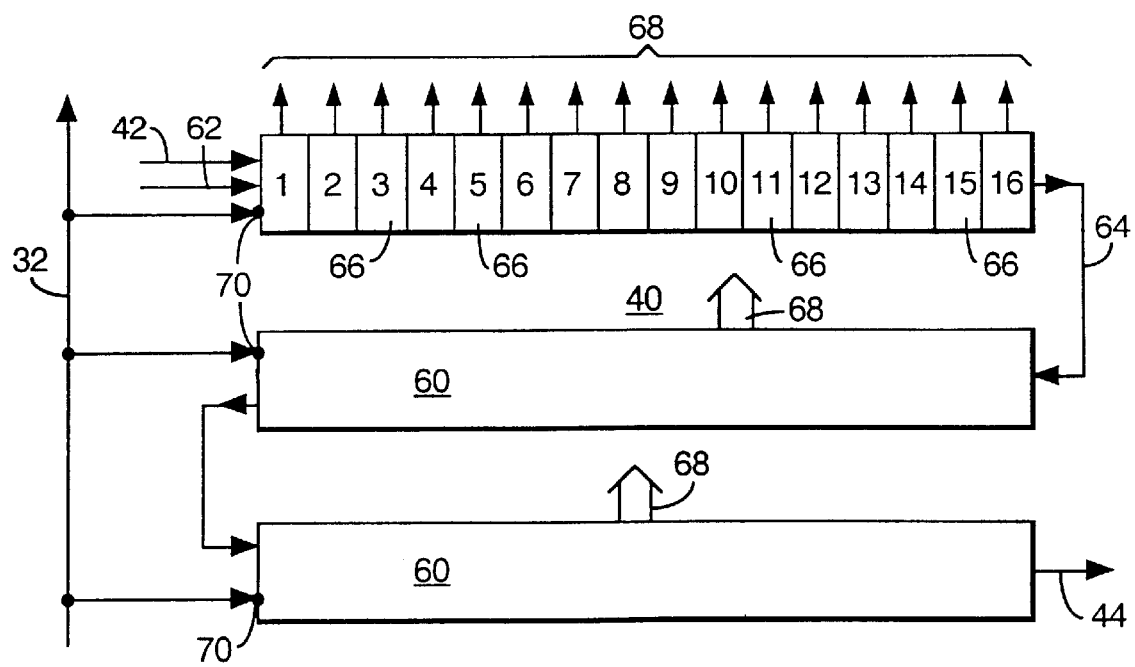
FIG. 6 is a schematic block diagram of the set of registers in accordance with the invention.

The set of registers or register file 40 is shown in more detail in FIG. 6 as comprising three registers 60. Each register has a serial input 62 and a serial output 64 and comprises 16 flip flop units 66. The flip flop units provide a parallel output 68. The registers are coupled at select inputs 70 to address bus 32.

The registers 60 shown have a bit length of 16 bits in order to accommodate 16 bit instructions for the processor. If the processor has a different instruction format, for example 8 bits or 32 bits, then the register length will be altered accordingly. Further, in a typical application, the number of registers in the register file may be altered. Typically, the number will be less than 10, say 6 to 8, and may be as small as 2 or 3. In a modification, the registers may be provided by a chain of latches. It is even possible to use a small area of static RAM, if logic is provided to make the RAM serially scannable.

Thus, in operation, the host computer initiates a debug mode by asserting signals on control lines in data bus 6 to interface 8, shown in FIG. 3. The scan chains 10 are accordingly activated and test data is fed through the scan chains to the appropriate registers. For the set of registers in the register file 40, an appropriate set of processor instructions are loaded into the registers through serial input line 42. At an appropriate point in the debug procedure, the processor reverts to normal operation but asserts addresses on address bus 32 for accessing the instructions in the register file 40. The multiplexer 48 is activated by debug mode control signal on line 52 so that data read out from the parallel outputs 68 of the registers are provided on line 46 and thus to the instruction register 38. The data in the program memory 34 which is read out at the same time on line 36, is deselected.

Thus, the processor carries out a smaller routine in accordance with the instructions in the register file, and when the instructions have been carried out, the host computer 4 reasserts control for completing the debug procedure.

The key advantages of this invention are:

1) it is embedded in the microprocessor itself, as part of the program memory interface, so that the performance impact is minimal and predictable.
2) it requires no hardware external to the microprocessor
3) allows the implementation of micromonitors even in entirely ROM based systems
4) any peripheral or memory which can be accessed by the microprocessor is accessible during debug operation
5) the program in the register file is entirely software programmed, so that if a complex device needs to be accessed or if further uses are devised they may be simply implemented by writing in a different set of instructions.

The invention thus provides a serially loadable register file embedded within a microprocessor to facilitate loading and execution of small programs during debugging of systems and software running on the microprocessor. It facilitates debugging of embedded microprocessor systems which have no program RAM.

What is claimed is:

1. In a processor including in-circuit emulation means comprising one or more scan chains of serially connected registers for access by an external host computer system, a method of carrying out a debug procedure comprising:

the host computer system carrying out a debug procedure at a debug processing speed via said scan chains, and selectively interrupting said debug procedure for access to a peripheral or other memory mapped device;

in response to said host computer system selectively interrupting said debug procedure, the host computer system writing via said scan chains into an area of memory of the processor a program for reading and/or writing data at a specified memory location for access to a said peripheral or other memory mapped device; and the host computer system configuring the processor to execute the program upon the host computer system exiting the debug procedure;

the host computer system exiting the debug procedure causing the processor to execute the program at a full processor speed: and upon a completion of the execution of the program by the processor, the program causing the host computer system to reenter the debug procedure.

2. A method according to claim 1, wherein prior to writing said program to said area of memory, the host copies data in said area of memory to the host computer, and upon return to the debug procedure, writes such data back into said area of memory.

3. A method according to claim 1 or 2, wherein upon return to said debug procedure, the data at said specified memory location is written to the host.

4. A method according to claim 1, wherein the host computer system includes a file for determining the configuration of the processor for different types of memory mapped devices, and configuring the processor in accordance with the file.

5. A method according to claim 1, wherein prior to running the program, the host system selectively configures predetermined registers of the processor for said program.

6. A host computer system for carrying out the method of claim 1, the computer system including interface means for supplying data and instructions to one or more scan chains of a target processor for carrying out a debug procedure, and the host computer including a file means for a plurality of memory mapped devices of the target processor, the file means including configuration information of selected registers of the target processor, and the host computer system including a plurality of monitor programs for selectively loading into an area memory of the target processor for reading and/or writing data at a specified memory location.

7. A processor including in-circuit emulation means comprising one or more chains of serially connected registers coupled to interface means for access by an external host to enable a serial scan procedure to be carried out, one such chain including a set of serially coupled registers for storing one or more processor instructions read into a set of registers through the interface means, and the processor including address means, for addressing program memory, coupled to said set of registers for addressing the set of registers, and means for reading the processor instructions in the set of registers to an instruction register of the processor:

coupling an input into the registers to an address bus of the processor;

coupling an output of the registers to one input of a multiplexer;

coupling another input of the multiplexer to an output of a program memory of the processor;

providing an output of the multiplexer, wherein the output of the multiplexer is either data received from the program memory or data received from the registers; and in response to a direction to the processor to address the register set, causing the multiplexer to select its input coupled to the registers, such that data is being read from the registers instead of from the processor's program memory.

8. A processor according to claim 7, wherein said registers are implemented as chains of flip-flops or latches.

9. A processor according to claim 7 or 8 wherein the set of registers is coupled to said address means so as to be addressable within the normal unextended address range of the processor.

10. A processor according to claim 7 wherein each said register has a parallel output coupled to an instruction bus of the processor.

11. A processor according to claim 7, including a multiplexer means having a first input coupled to the outputs of the registers, a second input coupled to the program memory, and an output coupled to the instruction register of the processor, the inputs being selectable under the control of a debug control signal.

12. A method of in-circuit emulation for a processor comprising:

provoding in the processor one or more chains of serially connected registers coupled to an interface means, one of said one or more chains including a set of serially coupled registers, coupling an input into the registers to an address bus of the processor;

coupling an output of the registers to one input of a multiplexer;

coupling another input of the multiplexer to an output of a program memory of the processor;

providing an output of the multiplexer, wherein the output of the multiplexer is either data received from the program memory or data received from the registers;

(b) feeding to the registers set, through said interface means and said one scan chain, one or more processor instructions, (c) directing the processor to address the register set using its address bus; and in response to a direction to the processor to address the register set, causing the multiplexer to select its input coupled to the registers, such that data is being read from the registers instead of from the processor's program memory.

* * * * *